No. 740,258. PATENTED SEPT. 29, 1903.
G. A. ENSIGN.
BELT PULLEY.
APPLICATION FILED FEB. 10, 1903.
NO MODEL.

WITNESSES:
Edward Thorpe
Theo. J. Hoster

INVENTOR
George A. Ensign
BY
Munn
ATTORNEYS.

No. 740,258.

Patented September 29, 1903.

UNITED STATES PATENT OFFICE.

GEORGE A. ENSIGN, OF DEFIANCE, OHIO, ASSIGNOR TO DEFIANCE MACHINE WORKS, OF DEFIANCE, OHIO.

BELT-PULLEY.

SPECIFICATION forming part of Letters Patent No. 740,258, dated September 29, 1903.

Application filed February 10, 1903. Serial No. 142,697. (No model.)

*To all whom it may concern:*

Be it known that I, GEORGE A. ENSIGN, a citizen of the United States, and a resident of Defiance, in the county of Defiance and State of Ohio, have invented a new and Improved Belt-Pulley, of which the following is a full, clear, and exact description.

The invention relates to the transmission of power by pulleys and belt, and its object is to provide a new and improved belt-pulley arranged to prevent lateral shifting of the belt by keeping the latter in a central position on the belt-surface, to provide a ready escape for the air between the belt and the peripheral face of the pulley, to insure proper contact between the belt and pulley, to increase the adhesion between the contacting surfaces, and consequently produce a more positive transmission of the power.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1:
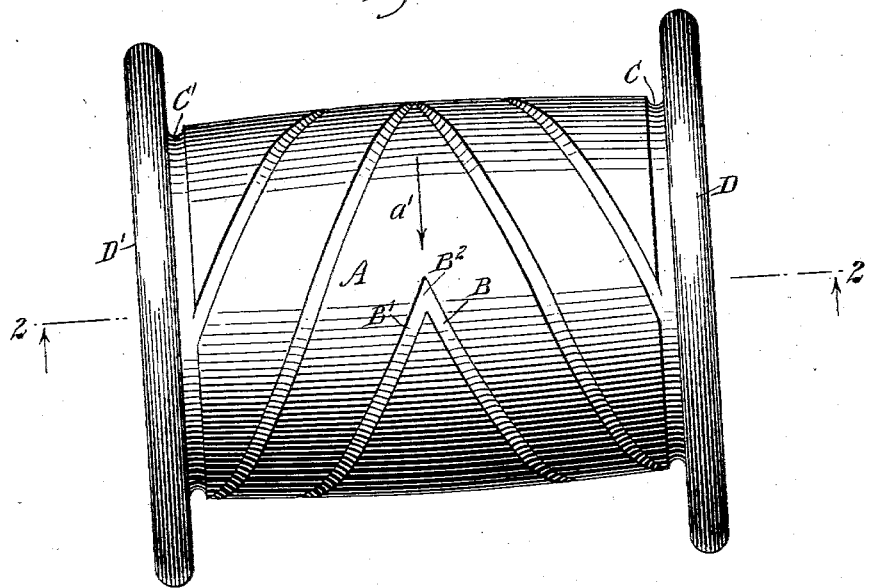
Figure 2:
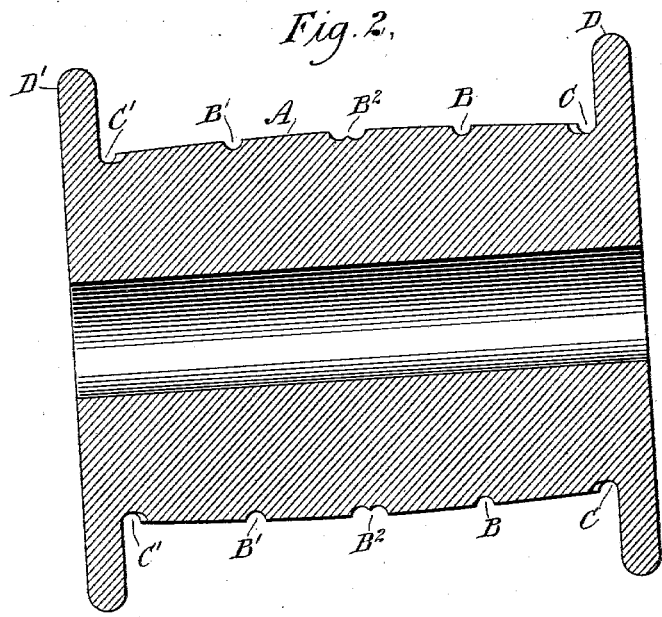

Figure 1 is a side elevation of the improvement, and Fig. 2 is a longitudinal sectional elevation of the same on the line 2 2 of Fig. 1.

The belt-surface A of the pulley is provided with a plurality of pairs of spiral grooves B and B', and the grooves in each pair are preferably of the same pitch and have a common starting-point $B^2$ at or near the middle of the peripheral face or belt-surface A.

One of the grooves in each pair of grooves is a right-hand groove and the other a left-hand groove, and the grooves terminate at the sides of the belt-surface A in annular grooves C and C' after having an approximately one-half turn around the belt-surface.

The annular grooves C and C' are arranged close to the inner faces of the flanges D and D' of the pulley in case such flanges are used, as the pulley may be constructed without such flanges. By the arrangement described the right-hand grooves C of the several pairs run parallel to each other, and the grooves C' are similarly disposed one to the other. The pairs of grooves are spaced sufficiently close so that the belt, which engages the belt-surface to an extent of about one hundred and eighty degrees or less, is at all times over several pairs of grooves, and hence all air entrapped between the contacting face of the belt and the belt-surface of the pulley finds a ready escape through the grooves to allow the belt to make a good contact with the belt-surface A of the pulley.

The grooves B and B' of each pair of grooves run from a starting-point $B^2$ in the direction of the arrow $a'$ (shown in Fig. 1)—that is, in the direction in which the pulley is turned—and by having the right and left hand grooves running from a common starting-point and at the same pitch it is evident that the belt is retained at all times in a central position on the belt-surface, as the tendency of one of the grooves in the pair of grooves to act on the belt to shift the same laterally is equalized by the other groove, and hence each pair of grooves tends to hold the belt in a central position.

From the foregoing it will be understood that whatever influence the grooves have on the belt is in the direction of retaining it in a central position even if the pulley is running at a very high speed.

By running the grooves around the belt-surface A for but one-half a turn it is evident that the air can escape very quickly, and hence air is not liable to be retained between the belt and the pulley, thus insuring a strong positive drive even at an excessively high speed of the pulley.

As the belt contact with the pulley-surface covers less than one hundred and eighty degrees of the circle and the grooves go half-way around the surface, it would be impossible for the belt to cover both ends of the groove at once when in operation, and consequently the pulley frees itself of the entrapped air very quickly, as before stated. It will be seen that with the construction shown and described no great amount of surface contact is sacrificed.

Having thus described my invention, I claim as new and desire to secure by Letters Patent—

1. A belt-pulley formed at each side of its belt-surface with an annular groove and having its belt-surface provided with a pair of spiral grooves having a common starting-point, approximately at the middle of the peripheral face of the pulley, the grooves making an approximately half-turn and terminating at the sides of the peripheral belt-surface, in said annular grooves, as set forth.

2. A belt-pulley provided with flanges at its ends and having annular grooves arranged close to the inner faces of the flanges, the peripheral surface of the pulley being provided with a plurality of pairs of spiral grooves, each groove extending approximately halfway around the pulley, the grooves of each pair extending from the annular grooves at the sides of the belt-surface to the middle of the pulley and meeting each other to form a continuous passage for the air, as set forth.

In testimony whereof I have signed my name to this specification in the presence of two subscribing witnesses.

GEORGE A. ENSIGN.

Witnesses:
JOSEPH BAUER,
GEO. W. DEATRICK.